(12) United States Patent
Tokuda

(10) Patent No.: US 6,330,927 B1
(45) Date of Patent: Dec. 18, 2001

(54) TIRE SLIP CONTROL DEVICE

(75) Inventor: Katsuhiko Tokuda, Kakogawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/633,464

(22) Filed: Aug. 7, 2000

(30) Foreign Application Priority Data

Aug. 9, 1999 (JP) .................................................. 11-225439
Jun. 26, 2000 (JP) .................................................. 12-191493

(51) Int. Cl.$^7$ .................................................. B60K 28/16
(52) U.S. Cl. .............................. 180/197; 701/82; 701/84
(58) Field of Search .............................. 180/197; 701/82, 701/84, 89, 90, 85–87

(56) References Cited

U.S. PATENT DOCUMENTS 5,018,595 * 5/1991 Hara et al. ............................ 180/197
5,569,117 * 10/1996 Kono et al. ............................ 180/197

FOREIGN PATENT DOCUMENTS

| 62-28831 | 2/1987 | (JP) . |
| 2528456 | 8/1988 | (JP) . |
| 63-263248 | 10/1988 | (JP) . |
| 4-2560 | 1/1992 | (JP) . |
| 7-109240 | 1/1992 | (JP) . |
| 4-36031 | 2/1992 | (JP) . |
| 4-231632 | 8/1992 | (JP) . |
| 6-58345 | 3/1994 | (JP) . |
| 8-2294 | 1/1996 | (JP) . |
| 5-108776 | 4/1996 | (JP) . |
| 11-62652 | 3/1999 | (JP) . |

* cited by examiner

*Primary Examiner*—Anne Marie Boehler
(74) *Attorney, Agent, or Firm*—Marshall, Gerstein & Borun

(57) ABSTRACT

A tire slip control device comprises: an engine; a torque converter connected to an output shaft of the engine; a transmission for transmitting a traveling driving force from the torque converter to an axle; an engine rotation detector; an output rotation detector for the transmission; and a control for restricting the traveling driving force, wherein the control for restricting the traveling driving force judges that slip has occurred and restricts the traveling driving force when a rate of change of the ratio of an output speed of the transmission to an engine speed per unit time exceeds a first predetermined value in an initial condition in which the output speed of the transmission is a second predetermined value or smaller in a high-speed rotation area of a predetermined engine speed or larger.

20 Claims, 5 Drawing Sheets

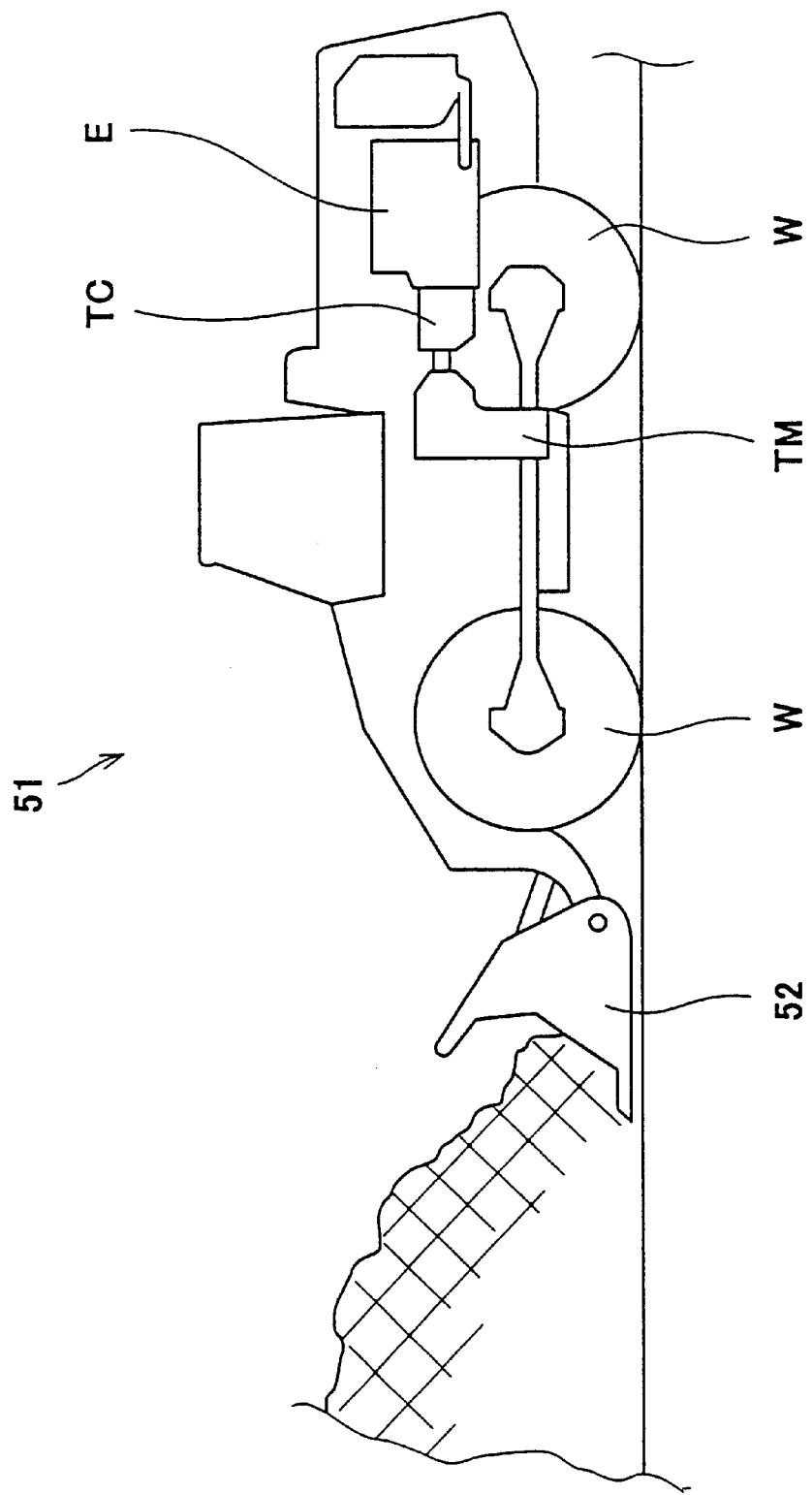

TIRE SLIP CONTROL DEVICE

BACKGROUND OF THE INVENTION

1. Field of the Invention

The present invention relates to a tire slip control device for a vehicle such as a loading vehicle. More particularly, the present invention relates to a tire slip control device for controlling slip of tires occurring when a torque converter stalls (i.e., when an output side of the torque converter is restricted and a slip ratio of the torque converter is thereby increased to 100% with the maximum torque being transmitted) or is in an almost-stall condition.

2. Description of the Related Art

For example, as shown in FIG. 5, a wheel loader 51 for loading operation is generally adapted to increase an engine speed (revolution speed of an engine E) to its maximum when pushing a bucket 52 into earth and sand or rocks to excavate and scoop up the same. At this time, a torque converter TC operates in a stall condition. However, driving wheels W tend to slip if a driving force is higher than a static frictional force. Such slip causes tires to wear in a short time. Also, slip on rubble causes the tires to be damaged. In particular, in case of a construction machine such as the wheel loader, the wear of the tires brings about an increase in maintenance cost. In FIG. 5, reference numeral TM denotes a transmission.

Conventionally, when such slip occurs, this is detected and the driving force to be transmitted to the wheels is restricted to suppress the slip. The prior arts are disclosed in Japanese Patent Application Publication No. Hei. 4-2560, Japanese Patent Application Publication No. Hei. 6-58345, Japanese Patent Application Publication No. Hei. 7-109240, and Japanese Patent No. 2528456.

In the conventional tire slip judgment method according to these prior arts, it is judged that slip has occurred by detecting difference of a revolution speed between right and left driving wheels, by detecting difference of acceleration between the right and left driving wheels, or by detecting difference of a revolution speed between driving wheels and driven wheels.

When the occurrence of slip is confirmed, a rotational driving force of the driving wheels is controlled to suppress the slip. Specifically, in order to suppress the slip, the rotational driving force of the driving wheels is suppressed by braking, the rotational driving force of the driving wheels is suppressed by incompletely engaging a clutch, and the rotational driving force of the driving force is suppressed by reducing fuel supply to the engine to thereby reduce output torque and rotation of the engine.

However, when it is judged that the slip has occurred by detecting the difference of the revolution speed between the right and left driving wheels to thereby detect the slip, it is necessary to provide rotation detectors on right and left axles of the driving wheels, respectively. In addition, when there is an error due to the difference of the revolution speed between inner and outer wheels that is generated when a car body is turning or both of the driving wheels have slipped, it is impossible to judge whether or not the slip has occurred. The same problems occur when detecting the difference of acceleration between the right and left driving wheels. Furthermore, when detecting the difference of the revolution speed between the driving wheels and the driven wheels, it is necessary to additionally provide the rotation detectors on the driving wheels and driven wheels. Consequently, the conventional slip judgment method based on the difference of the revolution speed between the driving wheels and the driven wheels is not applicable to four-wheel-drive vehicles such as the wheel loader.

SUMMARY OF THE INVENTION

The present invention is directed to solving the above-described problems, and an object of the present invention is to provide a low-cost and highly reliable tire slip control device capable of controlling slip of driving wheels by accurately detecting the slip without the necessity of additionally providing a sensor.

In general, a driving force of a vehicle is changed from a high driving force to a low driving force with a change from low-speed traveling to high-speed traveling. At this time, if tire slip occurs because the driving force has exceeded the static frictional force, the change of the driving force per unit time becomes greater than the change of the driving force per unit time at normal accelerated traveling. In case of power transmission by a torque converter, the driving force is represented by an input speed (input revolution speed) of the torque converter, and the ratio of the input speed and an output speed (output revolution speed) of the torque converter at that point of time.

The tire slip control device of the present invention utilizes such characteristics, and comprises an engine; a torque converter connected to an output shaft of the engine; a transmission for transmitting a traveling driving force from the torque converter to an axle; an engine rotation detector; an output rotation detector for the transmission; and means for restricting the traveling driving force, wherein the means for restricting the traveling driving force judges that slip has occurred and restricts the traveling driving force when a rate of change of the ratio of an output speed of the transmission to an engine speed per unit time exceeds a first predetermined value in an initial condition in which the output speed of the transmission is a second predetermined value or smaller in a high-speed rotation area of a predetermined engine speed or larger.

With such configuration, at the occurrence of slip of the driving wheels, i.e., when the engine is rotating at a high speed or the vehicle is stationary or is almost stationary, it is possible to detect that the change of rotation of the driving wheels greater than normal change of vehicle acceleration has occurred. For this slip detection, it is not necessary to provide an additional detector. Further, slip of right and left driving wheels can be detected. Upon detecting that slip has occurred, the traveling driving force is restricted to stop the slip.

It should be noted that the output rotation detector of the transmission may be provided on a transmission shaft from an output shaft of the transmission to a differential gear, not to mention the output shaft of the transmission. Moreover, it is possible to provide the detector on one of a transmission shaft and gears placed on an output side of a change gear in an internal mechanism of the transmission.

Another embodiment of the tire slip control device of the present invention comprises: an engine; a torque converter connected to an output shaft of the engine; a transmission for transmitting a traveling driving force from the torque converter to an axle; an engine rotation detector; an output rotation detector for the transmission; and means for restricting the traveling driving force, wherein the means for restricting the traveling driving force judges that slip has occurred and restricts the traveling driving force when a rate of increase of an output speed of the transmission per unit time exceeds a first predetermined value in an initial condition in which the output speed of the transmission is a second predetermined value or smaller in a high-speed rotation area of a predetermined engine speed or larger.

With this configuration, the same effects as a control device that judges occurrence of slip by using the rate of change of the ratio of the revolution speed per unit time can be achieved. The output rotation detector for the transmission may be provided as described above.

Still another embodiment of the tire slip control device of the present invention comprises an input rotation detector for the transmission for replacing the output rotation detector for the transmission of the above tire slip control device. Since members provided on the input side of the transmission are connected to the wheels via respective transmission shafts, the occurrence of tire slip can be detected from the rotation of the members provided on the input side of the transmission.

The means for restricting the traveling driving force switches an engine output so that the engine speed is reduced to the revolution speed smaller than the revolution speed at a point of time when it is judged that slip has occurred, to thereby reduce input torque to the transmission thereby restricting the traveling driving force. With such configuration, the torque to be transmitted to the driving wheels is reduced to thereby reduce the revolution speed of the driving wheels. This effectively stops the slip.

The means for restricting the traveling driving force includes an engine governor having a function of changing an output characteristic of the engine, and the engine governor restricts the traveling driving force by switching an output characteristic of the engine at the point of time when it is judged that slip has occurred to a torque characteristic in which output torque in the high-speed rotation area is lower than output torque of the output characteristic of the engine at the point of time when it is judged that slip has occurred. With such configuration, an additional device such as a pressure control valve need not be provided unlike in the control by braking. Besides, load placed on a clutch plate is not increased and high reliability of control is provided unlike in the clutch engagement control for intentionally bringing the clutch out of engagement. Furthermore, because of restriction of input power, loss of energy can be reduced.

The engine governor switches the output characteristic of the engine at the point of time when it is judged that slip has occurred to the torque characteristic of the lower output torque, to reduce the engine speed to the revolution speed smaller than the revolution speed at the point of time when it is judged that slip has occurred and reduce one of the output speed of the transmission and the input speed of the transmission to the revolution speed smaller than the second predetermined value, and then switches the torque characteristic of the lower output torque back to the output characteristic of the engine. Thereby, slip control of high reliability can be achieved.

The engine governor switches the output characteristic of the engine to the torque characteristic of the lower output torque and, after an elapse of set time, switches the torque characteristic back to the output characteristic of the engine. Thereby, stable driving of the vehicle can be achieved.

This object, as well as other objects, features and advantages of the invention will become more apparent to those skilled in the art from the following description taken with reference to the accompanying drawings.

BRIEF DESCRIPTION OF THE DRAWINGS

FIG. 5 is a side view showing a loading vehicle to which the tire slip control device of the present invention can be applied.

DETAILED DESCRIPTION OF THE PREFERRED EMBODIMENTS

Hereinafter, a preferred embodiment of a loading vehicle and a method for controlling an output of the loading vehicle according to the present invention will be described with reference to accompanying drawings.

Figure 1:
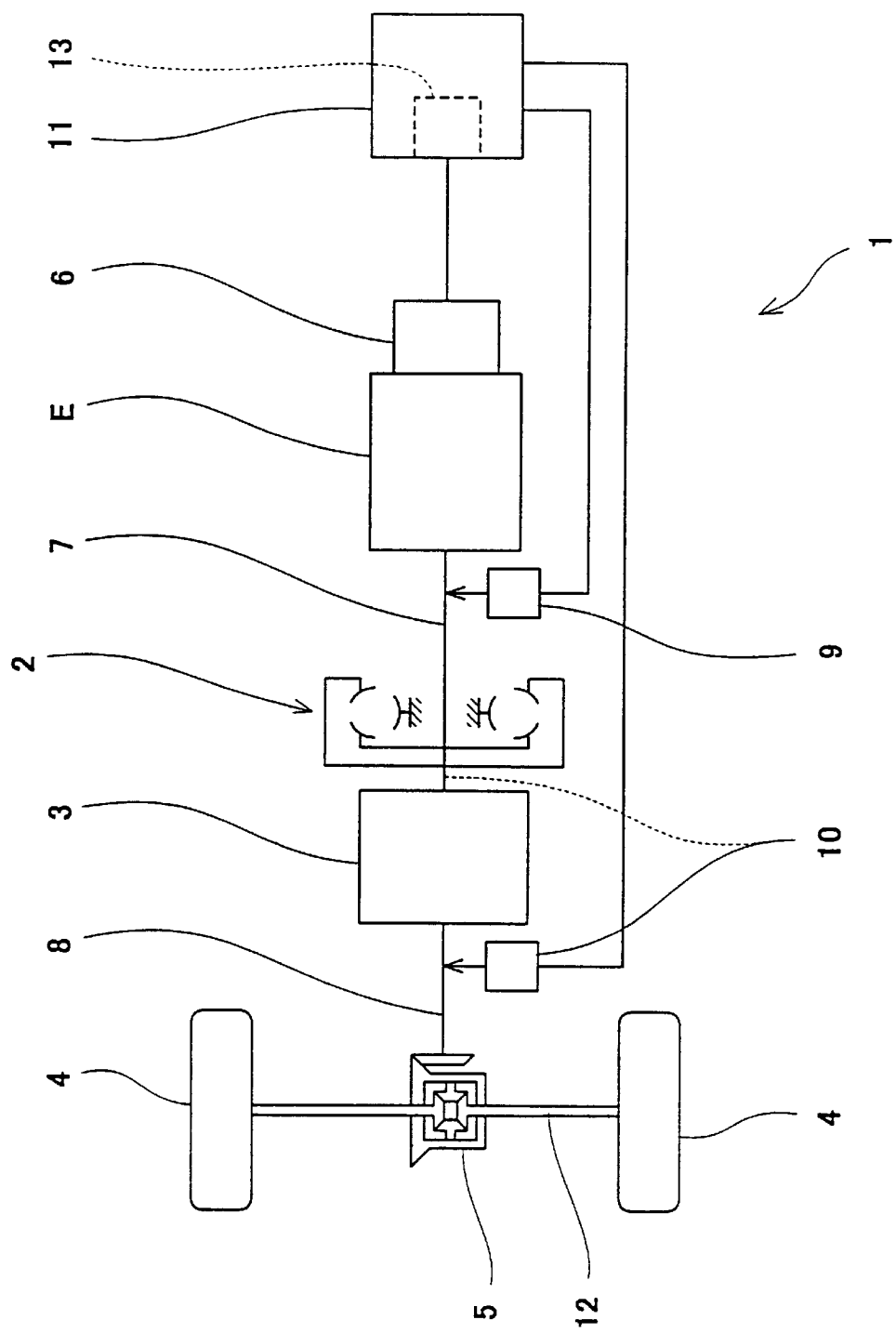
FIG. 1 is a view showing an embodiment of a tire slip control device of the present invention.

FIG. 1 is a view showing a structure of an embodiment 1 of a tire slip control device (hereinafter referred to as a control device) of the present invention with which a vehicle such as a loading vehicle is equipped.

Referring now to FIG. 1, a driving force generated by an engine E is transmitted to front and rear driving wheels 4 via a torque converter 2 and a transmission 3, thereby moving the vehicle forward and rearward (in reverse). Reference numeral 12 denotes an axle and reference numeral 5 denotes a differential gear. The engine E is provided with an engine governor 6 having a function of switching an output characteristic of the engine E. The control device 1 is provided with rotation detectors 9 and 10 for detecting a revolution speed of an output shaft 7 of the engine E (hereinafter referred to as an engine speed) and a revolution speed of an output shaft 8 of the transmission 3 (hereinafter referred to as an output speed), respectively. These rotation detectors 9 and 10 are generally provided on the vehicle and used to control a transmission or display an operating state. In the control device 1, a slip controller 11 includes a second characteristic regulator 13 mentioned later. The second characteristic regulator 13 may be included in the engine governor 6 rather than in the slip controller 11. The second characteristic refers to one of torque characteristics of the engine and is represented by R2 in FIGS. 3(a) and 3(b).

While the rotation detector 10 is placed to detect the revolution speed of the output shaft 8 of the transmission 3 in this embodiment, this detection is not limited to detection of the revolution speed of the output shaft 8. For example, the rotation detector 10 may detect the revolution speed of any transmission shaft from the output shaft 8 to the differential gear 5. Further, the rotation detector 10 may detect the revolution speed of one of various gears and a transmission shaft placed on an output side of a change gear in an internal mechanism of the transmission 3.

Signals of the revolution speed detected by the respective rotation detectors 9 and 10 are respectively sent to the slip controller 11. The slip controller 11 judges whether or not slip has occurred (hereinafter referred to as slip judgment) from these signals. When it judges that slip has occurred, the slip controller 11 issues a command signal in accordance with which the engine governor 6 switches an output characteristic of the engine E to an output characteristic of the engine E selected by the second characteristic regulator 13.

Figure 2:
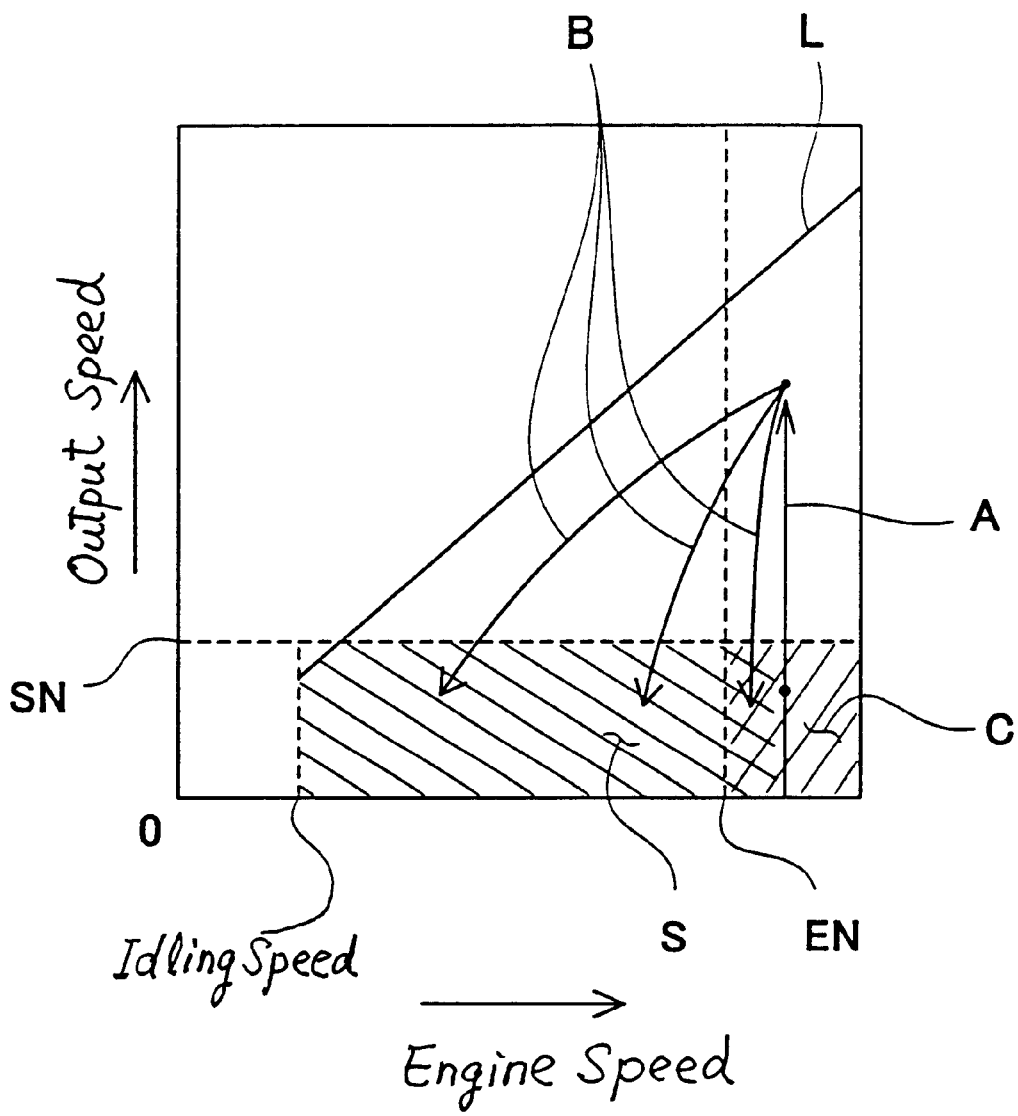
FIG. 2 is a view showing characteristics with an engine speed on a lateral axis and an output speed on a longitudinal axis.

FIG. 2 is a view showing characteristics with the engine speed detected by the rotation detector 9 on a lateral axis and the output speed detected by the rotation detector 10 on a longitudinal axis. Referring to FIG. 2, an area C having a predetermined value of an engine speed EN or larger and a predetermined value of an output speed SN or smaller is set for the slip controller 11 as an initial condition for slip judgment. The area C shows that the driving wheels 4 are restricted externally (torque converter operates in a stall condition) or almost restricted regardless of high-speed rotation of the engine E. That is, the lower right area in FIG. 2 shows that the driving force of the vehicle is high and slip tends to occur. More specifically, this happens when the vehicle pushes a bucket into earth and sand or rocks to excavate or scoop up the same, or engine power is full for abrupt starting. The predetermined value of the engine speed EN is approximately 2000 rpm using engine stall rotation as a criterion and the predetermined value of the output speed SN is approximately 400 rpm using a TC slip ratio 0.2 as a criterion.

Using the area C as an initial value for slip judgment, it is judged that slip has occurred when a rate of increase of the output speed per unit time has exceeded a predetermined value or when a rate of increase of the ratio of the output speed to the engine speed per unit time has exceeded a predetermined value. That is, when the engine speed and the output speed are within the area C, it is judged that slip has occurred from the fact that the driving wheels start to abruptly rotate although the driving wheels were stationary or were rotating at a low speed until now. Such operation is represented by an arrow A indicating that the output speed is increased rapidly from a point in the area C in FIG. 2. A line L in FIG. 2 is a straight line representing a maximum value for the output speed.

In the control device 1, when the slip controller 11 judges that slip has occurred, the slip controller 11 issues the command signal in accordance with which the engine governor 11 switches the output characteristic of the engine to the engine output characteristic selected by the second characteristic regulator 13. The engine governor 6 serves to control the amount of fuel injection to thereby control the output torque with respect to the engine speed. A control system of the engine governor can adopt an electric system and a mechanical system. In this embodiment, the engine governor 6 adopts the electric system.

Figure 3A:
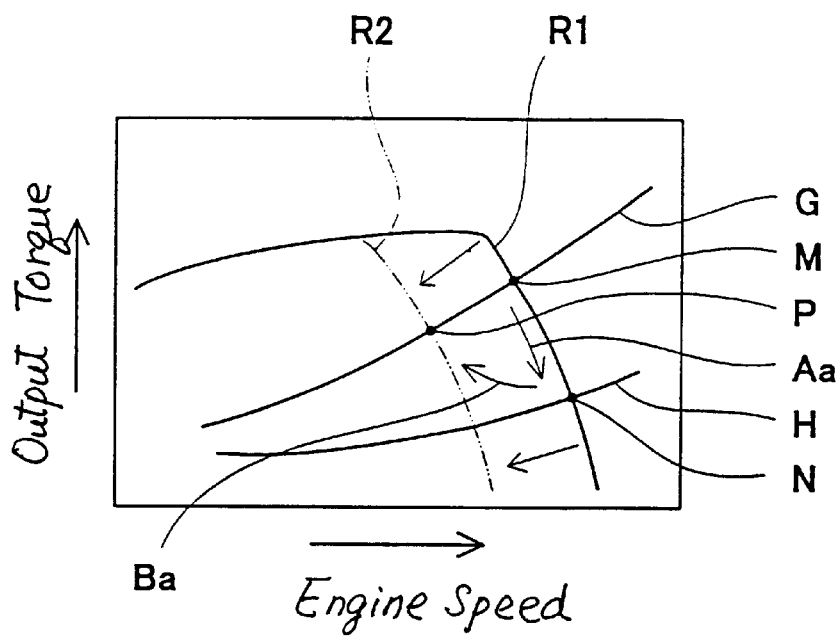
FIG. 3(a) and FIG. 3(b) are views showing characteristics with an engine speed on a lateral axis and output torque of the engine on a longitudinal axis.
Figure 3B:
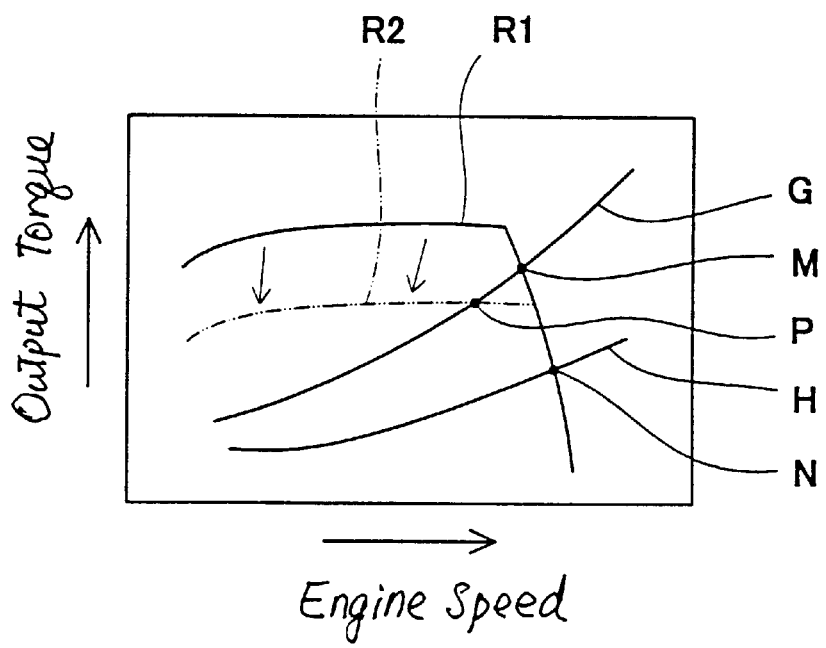

FIG. 3(a) shows a relationship between the output torque characteristic of the engine E and an absorption torque characteristic of the torque converter 2. FIG. 3(a) shows characteristics with the engine speed on the lateral axis and the output torque of the engine on the longitudinal axis. The engine governor 6 has a function of switching the output characteristic of the engine E between a first characteristic R1 and a second characteristic R2 shown in FIG. 3(a) in accordance with the command signal. This control operation is equivalent of releasing of a pedal of an accelerator. The second characteristic R2 has output torque at high-speed rotation lower than that of the first characteristic R1. In FIG. 3(a), a curved line represented by G shows the absorption characteristic in the stall condition in which rotation is not transmitted by the torque converter 2 (the ratio of the input speed of the torque converter to the output speed of the torque converter is 1:0), while a curved line represented by H shows the absorption torque characteristic in a high-speed traveling condition in which 100% of the rotation is transmitted by the torque converter 2 (the ratio of the input speed of the torque converter to the output speed of the torque converter is 1:1). Also, R2 can be set as shown in FIG. 3(b). The maximum torque of the engine E is reduced to R2 to change an intersection M to an intersection P on the lower torque.

In the control device 1, the engine E has the first characteristic R1 in a normal operating condition, which is switched to the second characteristic R2 when it is judged that slip has occurred. Consequently, in the control device 1, the engine speed is reduced as indicated by arrows B in FIG. 2 and a low slip ratio condition is changed into a high slip ratio condition (stall condition) while reducing the output torque. With this change, the output speed is reduced to stop the slip. When it is judged that the slip has stopped, the second output characteristic R2 is switched back to the first output characteristic R1.

Typical slip control will be explained with reference to FIG. 3(a). First, the slip occurs at the intersection M of the first characteristic curved line R1 and the stall curved line G, which transitions to the intersection N of the first characteristic curved line R1 and the high-speed traveling curved line R2 as indicated by an arrow Aa. Then, the slip controller 11 and the engine governor 6 as means for restricting the traveling driving force perform control to switch the first characteristic curved line R1 to the second characteristic curved line R2 to thereby eliminate the slip at an intersection P of the second characteristic curved line R2 and the stall curved line G (as indicated by an arrow Ba).

A set value for the second characteristic R2 is selected depending upon a response characteristic of the engine E, a surface condition of a road, and the like. This set value is selected from a value ranging from the engine speed at the point of time when it is judged that slip has occurred, as an upper limit value, to an idling speed as a lower limit value. Alternatively, for selection of the set value for the second characteristic R2, the engine speed at the point of time when it is judged that slip has occurred may be used as the upper limit value and the revolution speed represented by EN in FIG. 2 may be used as the lower limit value. Besides, the revolution speed represented by EN may be used as the upper limit value and the idling speed may be used as the lower limit value. In this embodiment, the second characteristic regulator 13 serves to automatically set the above range. Instead of automatically, a driver may manually operate the second characteristic regulator 13. In this case, the second characteristic regulator 13 is placed to be easily handled by the driver.

There are various methods for judging that slip has been eliminated.

For instance, after verifying that slip is eliminated after an elapse of predetermined time after switching from the first characteristic curved line R1 to the second characteristic curved line R2, the predetermined time is set by a timer as continuation time of the second characteristic R2.

Alternatively, after verifying that slip is eliminated when the output speed is reduced to a predetermined value or smaller as a result of switching to the second characteristic R2, the second characteristic R2 may be switched back to the first characteristic R1 when the output speed becomes the predetermined value or smaller (an area represented by S in FIG. 2)

Further, alternatively, after verifying that slip is eliminated when the ratio of the output speed to the engine speed is reduced to a predetermined value or smaller, the second characteristic R2 may be switched back to the first characteristic R1 when the ratio becomes the predetermined value or smaller.

Figure 4:
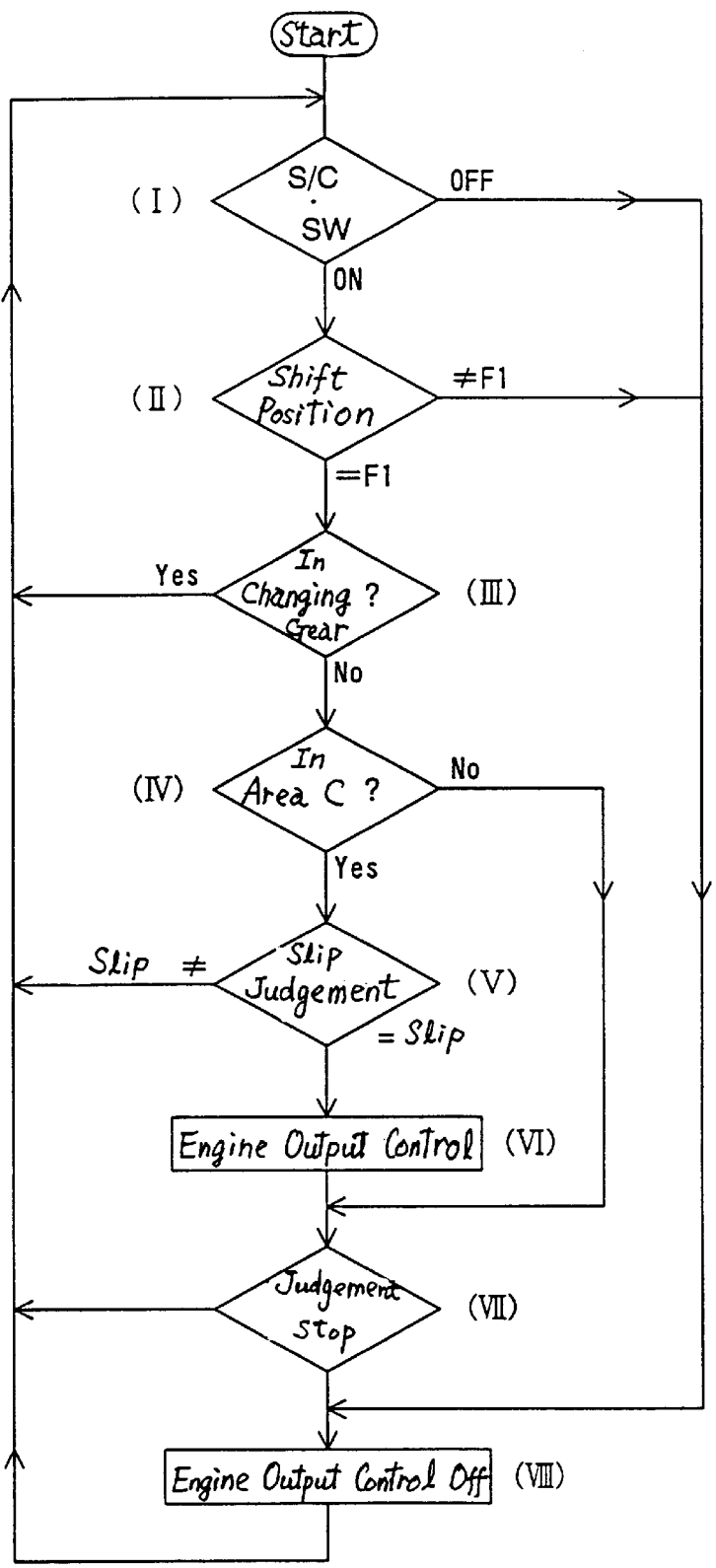
FIG. 4 is a flowchart showing an operation of the tire slip control device of the present invention.

FIG. 4 shows an information flowchart of the above-described operation.

In FIG. 4, in (I), a slip control switch (S/C Sw) is used to select the necessity/unnecessity of slip control. When the slip control is not always required, for example, during traveling, the switch may be OFF.

When the switch is ON in (I), it is judged whether or not gear change is a first gear (F1) in (II). In this Figure, it is assumed that the slip control is to be performed only when the gear change is the first gear (F1) selected for excavating operation.

In (III), it is judged whether or not gear is being changed at that point of time. This is because, during gear change, the vehicle is not in a normal power transmission condition due to fluctuation of engagement of a clutch, and rotation is therefore unstable, causing low reliability of slip judgment. This is noticeable when the rotation detector 10 is placed to detect the revolution speed of members provided on an input side of the transmission as mentioned later.

When it is judged that the gear is not being changed, it is judged whether or not the engine speed and the output speed are within the area C in (IV), and when it is judged that they are not, the slip judgment is not to be performed.

On the other hand, when it is judged that they are within the area C, it is judged whether or not slip has occurred in (V). When it is judged that the slip has occurred, switching of the output characteristic of the engine E (E/G output control, for example, switching from the first characteristic R1 to the second characteristic R2) is carried out as mentioned previously.

Thereafter, in (VII), it is judged whether or not slip has stopped from the predetermined time set by the timer or judgment of the revolution speed. Then, in (VIII), E/G output control is stopped. For example, the output characteristic of the engine E is switched back from the second characteristic R2 to the first characteristic R1.

The switching of the output characteristic of the engine may be replaced by control operation such as restriction of the amount of injection of a fuel injection device by mechanically releasing the pedal of the accelerator.

In the slip judgment of the above-described embodiment, the revolution speed of the member provided on the output side of the engine E and the revolution speed of the member provided on the output side of the transmission are used for slip judgment. Alternatively, the revolution speed of the member provided on the output side of the engine E and the revolution speed of the member provided on the input side of the transmission may be used for slip judgment. Specifically, as shown in FIG. 1, the rotation detector 10 may be provided on the output shaft of the torque converter 2, the input shaft of the transmission 3, or one of various gears and a transmission shaft provided on an input side of a change gear in an internal mechanism of the transmission 3.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A tire slip control device comprising:
   an engine;
   a torque converter connected to an output shaft of the engine;
   a transmission for transmitting a traveling driving force from the torque converter to an axle;
   an engine rotation detector;
   an output rotation detector for the transmission; and
   means for restricting the traveling driving force, wherein the means for restricting the traveling driving force judges that slip has occurred and restricts the traveling driving force when a rate of change of the ratio of an output speed of the transmission to an engine speed per unit time exceeds a first predetermined value in an initial condition in which the output speed of the transmission is a second predetermined value or smaller in a high-speed rotation area of a predetermined engine speed or larger.

2. The tire slip control device according to claim 1, wherein the means for restricting the traveling driving force switches an engine output so that the engine speed is reduced to the revolution speed smaller than the revolution speed at a point of time when it is judged that slip has occurred, to thereby reduce input torque to the transmission thereby restricting the traveling driving force.

3. The tire slip control device according to claim 2, wherein the means for restricting the traveling driving force includes an engine governor having a function of changing an output characteristic of the engine, and the engine governor restricts the traveling driving force by switching an output characteristic of the engine at the point of time when it is judged that slip has occurred to a torque characteristic in which output torque in the high-speed rotation area is lower than output torque of the output characteristic of the engine at the point of time when it is judged that slip has occurred.

4. The tire slip control device according to claim 3, wherein the engine governor switches the output characteristic of the engine at the point of time when it is judged that slip has occurred to the torque characteristic of the lower output torque, to reduce the engine speed to the revolution speed smaller than the revolution speed at the point of time when it is judged that slip has occurred and reduce one of the output speed of the transmission and the input speed of the transmission to the revolution speed smaller than the second predetermined value, and then switches the torque characteristic of the lower output torque back to the output characteristic of the engine.

5. The tire slip control device according to claim 3, wherein the engine governor switches the output characteristic of the engine to the torque characteristic of the lower output torque and, after an elapse of set time, switches the torque characteristic back to the output characteristic of the engine.

6. A tire slip control device comprising:
   an engine;
   a torque converter connected to an output shaft of the engine;
   a transmission for transmitting a traveling driving force from the torque converter to an axle;
   an engine rotation detector;
   an output rotation detector for the transmission; and
   means for restricting the traveling driving force, wherein the means for restricting the traveling driving force judges that slip has occurred and restricts the traveling driving force when a rate of increase of an output speed of the transmission per unit time exceeds a first predetermined value in an initial condition in which the output speed of the transmission is a second predetermined value or smaller in a high-speed rotation area of a predetermined engine speed or larger.

7. The tire slip control device according to claim 6, wherein the means for restricting the traveling driving force switches an engine output so that the engine speed is reduced to the revolution speed smaller than the revolution speed at a point of time when it is judged that slip has occurred, to thereby reduce input torque to the transmission thereby restricting the traveling driving force.

8. The tire slip control device according to claim 7, wherein the means for restricting the traveling driving force includes an engine governor having a function of changing an output characteristic of the engine, and the engine governor restricts the traveling driving force by switching an output characteristic of the engine at the point of time when it is judged that slip has occurred to a torque characteristic in which output torque in the high-speed rotation area is lower than output torque of the output characteristic of the engine at the point of time when it is judged that slip has occurred.

9. The tire slip control device according to claim 8, wherein the engine governor switches the output characteristic of the engine at the point of time when it is judged that slip has occurred to the torque characteristic of the lower output torque, to reduce the engine speed to the revolution speed smaller than the revolution speed at the point of time when it is judged that slip has occurred and reduce one of the output speed of the transmission and the input speed of the transmission to the revolution speed smaller than the second predetermined value, and then switches the torque characteristic of the lower output torque back to the output characteristic of the engine.

10. The tire slip control device according to claim 8, wherein the engine governor switches the output characteristic of the engine to the torque characteristic of the lower output torque and, after an elapse of set time, switches the torque characteristic back to the output characteristic of the engine.

11. A tire slip control device comprising:
an engine;
a torque converter connected to an output shaft of the engine;
a transmission for transmitting a traveling driving force from the torque converter to an axle;
an engine rotation detector;
an input rotation detector for the transmission; and
means for restricting the traveling driving force, wherein the means for restricting the traveling driving force judges that slip has occurred and restricts the traveling driving force when a rate of change of the ratio of an input speed of the transmission to an engine speed per unit time exceeds a first predetermined value in an initial condition in which the input speed of the transmission is a second predetermined value or smaller in a high-speed rotation area of a predetermined engine speed or larger.

12. The tire slip control device according to claim 11, wherein the means for restricting the traveling driving force switches an engine output so that the engine speed is reduced to the revolution speed smaller than the revolution speed at a point of time when it is judged that slip has occurred, to thereby reduce input torque to the transmission thereby restricting the traveling driving force.

13. The tire slip control device according to claim 12, wherein the means for restricting the traveling driving force includes an engine governor having a function of changing an output characteristic of the engine, and the engine governor restricts the traveling driving force by switching an output characteristic of the engine at the point of time when it is judged that slip has occurred to a torque characteristic in which output torque in the high-speed rotation area is lower than output torque of the output characteristic of the engine at the point of time when it is judged that slip has occurred.

14. The tire slip control device according to claim 13, wherein the engine governor switches the output characteristic of the engine at the point of time when it is judged that slip has occurred to the torque characteristic of the lower output torque, to reduce the engine speed to the revolution speed smaller than the revolution speed at the point of time when it is judged that slip has occurred and reduce one of the output speed of the transmission and the input speed of the transmission to the revolution speed smaller than the second predetermined value, and then switches the torque characteristic of the lower output torque back to the output characteristic of the engine.

15. The tire slip control device according to claim 13, wherein the engine governor switches the output characteristic of the engine to the torque characteristic of the lower output torque and, after an elapse of set time, switches the torque characteristic back to the output characteristic of the engine.

16. A tire slip control device comprising:
an engine;
a torque converter connected to an output shaft of the engine;
a transmission for transmitting a traveling driving force from the torque converter to an axle;
an engine rotation detector;
an input rotation detector for the transmission; and
means for restricting the traveling driving force, wherein the means for restricting the traveling driving force judges that slip has occurred and restricts the traveling driving force when a rate of increase of an input speed of the transmission per unit time exceeds a first predetermined value in an initial condition in which the input speed of the transmission is a second predetermined value or smaller in a high-speed rotation area of a predetermined engine speed or larger.

17. The tire slip control device according to claim 16, wherein the means for restricting the traveling driving force switches an engine output so that the engine speed is reduced to the revolution speed smaller than the revolution speed at a point of time when it is judged that slip has occurred, to thereby reduce input torque to the transmission thereby restricting the traveling driving force.

18. The tire slip control device according to claim 17, wherein the means for restricting the traveling driving force includes an engine governor having a function of changing an output characteristic of the engine, and the engine governor restricts the traveling driving force by switching an output characteristic of the engine at the point of time when it is judged that slip has occurred to a torque characteristic in which output torque in the high-speed rotation area is lower than output torque of the output characteristic of the engine at the point of time when it is judged that slip has occurred.

19. The tire slip control device according to claim 18, wherein the engine governor switches the output characteristic of the engine at the point of time when it is judged that slip has occurred to the torque characteristic of the lower output torque, to reduce the engine speed to the revolution speed smaller than the revolution speed at the point of time when it is judged that slip has occurred and reduce one of the output speed of the transmission and the input speed of the transmission to the revolution speed smaller than the second predetermined value, and then switches the torque characteristic of the lower output torque back to the output characteristic of the engine.

20. The tire slip control device according to claim 18, wherein the engine governor switches the output characteristic of the engine to the torque characteristic of the lower output torque and, after an elapse of set time, switches the torque characteristic back to the output characteristic of the engine.

\* \* \* \* \*